UNITED STATES PATENT OFFICE.

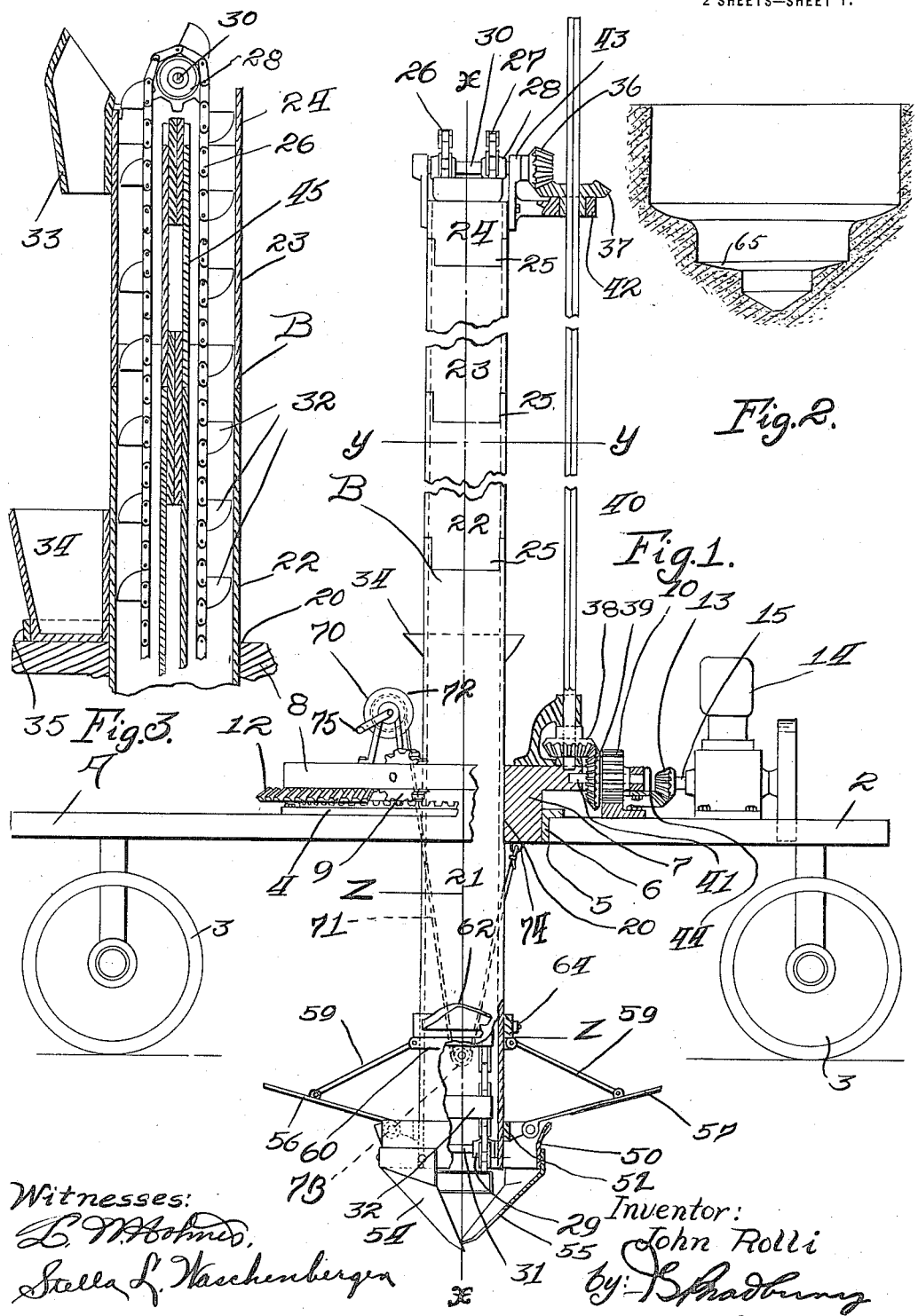

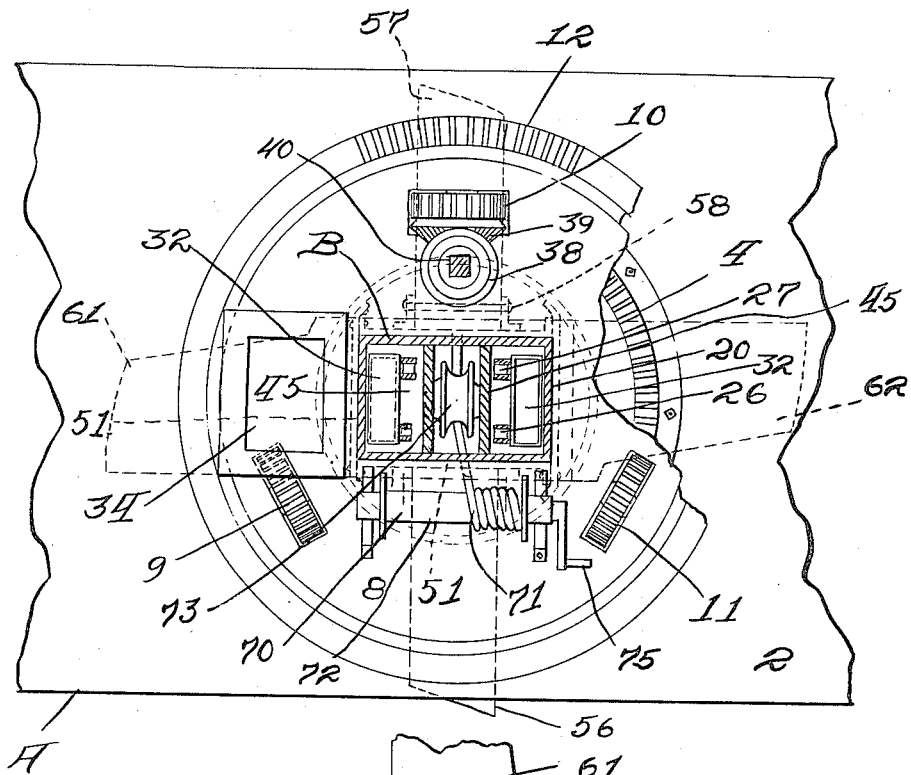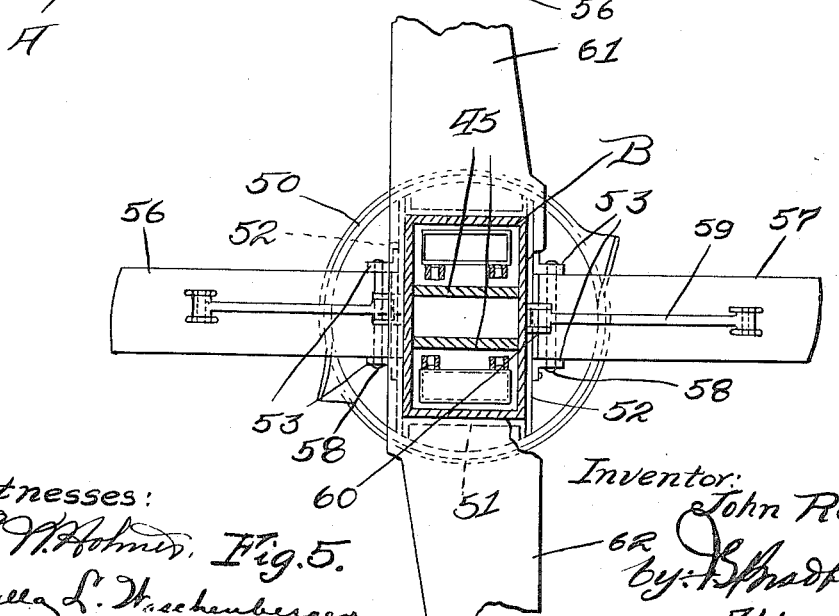

JOHN ROLLI, OF ENID, OKLAHOMA.

EXCAVATING-MACHINE.

1,189,739.   Specification of Letters Patent.   Patented July 4, 1916.

Application filed January 15, 1915. Serial No. 2,317.

*To all whom it may concern:*

Be it known that I, JOHN ROLLI, a citizen of the United States, residing at Enid, in the county of Garfield and State of Oklahoma, have invented a new and useful Improvement in Excavating-Machines, of which the following is a specification.

This invention relates to improvements in excavating machines, of that class, which is adapted for digging suitable openings in the ground, for silos, wells, post holes, foundations and shafts and other comparatively deep excavations.

The primary object of this invention is the production of a device of its kind, which can be easily transported from place to place, and made to quickly excavate suitable holes in the earth with a minimum amount of power.

Further objects are simplicity and inexpensive construction, greater effectiveness in use, and the production of a device, which will dig holes of any desired diameter without clogging the machine.

To these ends my invention comprises the features of construction and the combination of parts, which are hereinafter more particularly described and set forth in the claims.

In the accompanying drawings, forming part of this specification, Figure 1 is a side elevation, part in section of my invention; Fig. 2 is a section illustrating the shape of the hole, which the invention is adapted to excavate; Fig. 3 is a section of a detail taken on the line X—X of Fig. 1; Fig. 4 is a section taken on the line Y—Y, of Fig. 1, and Fig. 5 is a section taken on the line Z—Z, of Fig. 1.

In the drawings, A indicates a truck having a platform 2 and carrier wheels 3, said truck being adapted to support my improved excavator and being of any suitable construction desired.

4 indicates a crown gear, which is mounted upon the platform 2, concentric with an opening 5 through the platform, which contains a bushing 6, forming a bearing in which the stud 7 on a revoluble member 8 is journaled. The revoluble member carries three or more pinions 9, 10 and 11, equally distanced apart around the circumference of the revoluble member, and having their teeth in mesh with the teeth of the crown gear 4. The revoluble member also carries on its lower surface an outwardly projecting bevel gear 12, the teeth of which mesh with a drive pinion 13, said pinion being driven by any suitable prime mover, such as a gas engine 14, upon the drive shaft 15 on which said pinion is mounted. The revolution of the pinion 13 thus transmits motion to the revoluble member 8, and causes said member and the parts which it carries to revolve in the bearing 6 in a horizontal plane above the platform 2.

The revoluble member is formed with a vertical opening 20, through which a tube or tubular casing B is vertically slidable. This tube is made in sections of any number, such as 21, 22, 23, and 24, which are separably joined together by the tongue and groove joints 25. The lower section 21 of said tube is adapted to carry the earth cutting mechanism to be hereinafter described, which excavates the opening in the ground and conducts the loose earth which is removed into position to be lifted by conveyer mechanism through the tube. The conveyer mechanism, consists of a pair of link belts 26 and 27, traveling over pairs of sprocket wheels 28 and 29, at the upper and lower ends of the tube. The sprocket wheels 28 are mounted upon the shaft 30, which is journaled in the upper section 24 of the tube, and the sprockets 29 are mounted upon the shaft 31, which is journaled in the lower section 21. The pair of link belts carries at suitable intervals buckets 32 of usual form, which are adapted to dip down into the loose earth at the lower end of the tube and engage and lift the earth depositing it at the upper end of the tube into a chute 33, which in turn guides it downwardly into a bucket or receptacle 34, placed upon the revoluble member 8, and held by the frame work 35.

The shaft 30 is driven by a gas engine through intermediary gears 36, 37, 38 and 39, and power transmission shafts 40 and 41. The gear 36 is in the form of a pinion mounted upon the shaft 30 and the gear 37, with which the teeth of the pinion 36 mesh is journaled upon a support 42, which extends from the side of one of the journal supports 43, in which the shaft 30 is mounted, said supports 42 and 43, being carried by the upper section 24 of the casing. The gear 37 is feathered to the shaft 40, permitting the gear 37 to be moved longitudinally when the number of sections of which the tubular casing is composed is changed and when the tube moves downwardly. The lower end of the shaft 40 carries the bevel gear 38, the teeth of which mesh with the teeth of the bevel gear 39, which is mounted upon a shaft 41, said shaft being journaled in the revoluble member 8 and in a support 44 carried by the gear 12. The shaft 41 also carries the gear 10, the teeth of which mesh with the teeth of the crown gear 4, which is held stationary on the platform 2. Thus as the revoluble member 8 is revolved by the drive pinion 13, the gear 10 is also revolved, turning with it the bevel gear 39, and thus transmitting power to the shaft 30, which in turn operates the conveyer. The receptacle 34 being mounted upon the revoluble member 8 moves with the latter and receives the earth which is deposited from the conveyer. From time to time the receptacle can be removed by hand, emptied and replaced in receiving position.

The interior of the tube B is provided with a vertical partition in the form of double wall sections 45, which are jointed together when the sections of the casing are fastened, the partition thus formed separating the sides of the belts of the conveyer, and being double in form to provide a vertical space upwardly in the sections of the tube.

The earth cutting mechanism mounted upon the lower section 21 of the tube, consists of a cylindrical shell 50 placed vertically over said section and spaced from its wall to form a chamber. This shell is secured to the wall of the section 21 by the supports 51 and 52 in the form of sleeves, having radiating arms 53. The lower end of the cylindrical shell 50 is provided with a pair of downwardly and inwardly projecting suitably pitched earth cutting blades 54 and 55, which are adapted to bore down into the ground and force the loosened earth into position to be engaged and lifted by the buckets 32 of the conveyer. The upper end of the cylindrical casing 50 carries a pair of diametrically opposite, suitably pitched and outwardly extending earth cutting blades 56 and 57, the inner ends of which are hinged by the pivot connections 58 to the arms 53 extending from the collar 52. The outer ends of the blades 56 and 57 are supported by the arms 59, which are removably attached to a collar 60, which is mounted upon the wall of the tube B. The blades 56 and 57 being superimposed above the blades 54 and 55 are adapted to follow and cut the earth in a wider swath, than the lower blades as the tube is revolved. Positioned immediately above the collar 60, is a third set of cutting blades 61 and 62, having a still wider swath than the blades 56 and 57. The blades 61 and 62 are mounted upon the collar 63, which is secured by the bolts 64 to the tubular casing B, said blades being tilted up and inclined outwardly. This downward and inward inclination of the blades causes the earth which is cut by the blades 61 and 62 to run downwardly and inwardly above the blades 56 and 57, and upon the shoulder 65 (see Fig. 2), of earth which is cut by the blades 56 and 57. All of the loose earth cut by the blades 56, 57, 61 and 62 passes into the chamber formed by the shell 50, and from thence is guided by the blades 54 and 55 into the buckets 32, which lift the earth through the conveyer tube as fast as it is cut by all of the blades. The shape of the opening in the ground which is excavated by the cutters is illustrated in Fig. 2, and is adapted for the construction of silos or foundations. When desired the blades 61 and 62 need not be employed, and in such event the opening which is excavated is of less diameter than otherwise. It is also possible to remove both the blades 61 and 62 and 56 and 57, using only the blades 54 and 55 on the lower end of the casing 50 for excavating a hole, which is particularly useful for setting posts or digging wells.

It will be noted that the conveyer tube B is rectangular in cross section, as illustrated, this shape, causing the tube to revolve with the revoluble support 8, but permitting the tube to slide vertically as the cutting mechanism sinks deeper into the ground or is removed. For the purpose of lifting the tube, a winch 70 is mounted upon the revoluble member 8, a flexible cable 71 being wound upon its drum 72 and passing over a sheave 73 journaled between the sides of the partition 45 in the lower section 21 of the tube and its end being secured at 74 to the lower portion of the stud 7 of the revoluble member. Thus by turning the crank 75 of the winch the drum 72 can be made to wind the cable, and lift the tube and the cutting mechanism clear of the ground, so that the apparatus can be moved from place to place by the truck, and used wherever desired.

The construction provides a simple and effective means for quickly digging or excavating openings in the ground of large or small diameter of any depth desired, and permits of being driven by any source of power, such as a gas engine as illustrated, or when desired by other means available for work of this character.

When the tube is lengthened or shortened, by adding or removing sections thereof, the conveyer belt is correspondingly lengthened or shortened.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. In combination with a support, a revoluble element mounted upon said support, means for turning said revoluble element, a conveyer tube composed of detachable sections adapted to be revolved with said element, an endless carrier disposed for movement within said tube, and a cutter operably connected with the lower of said sections arranged to deliver to said endless carrier.

2. In combination with a support, a revoluble element mounted upon said support, means for turning said revoluble element, a conveyer tube composed of a succession of separable longitudinal sections joined together and vertically slidable and mounted in said revoluble element to revolve therewith, an endless carrier mounted in said tube for lifting loose earth from the lower to the upper end thereof, and a plurality of superimposed cutters carried by the lower of said tube sections, said cutters being of different lengths and extending successively a greater distance laterally from said tube to increase the cutting swath thereof.

3. In combination with a truck platform, an upwardly extending conveyer tube freely movable up and down in said revoluble element and mounted to turn therewith, an endless carrier extending from the lower to the upper end in said tube and a plurality of cutters mounted upon the lower end of said tube in superimposed relation, said cutters being of different lengths and extending successively a greater distance laterally from said tube to increase the cutting swath thereof, the lowermost of said cutters extending downwardly and inwardly to conduct the loose earth into engaging position by the lower end of said carrier.

In testimony whereof, I have signed my name to this specification, in the presence of two subscribing witnesses.

JOHN ROLLI.

Witnesses:
CLARENCE W. HALBERT,
F. G. BRADBURY.